United States Patent [19]

Reynolds

[11] 4,442,671

[45] Apr. 17, 1984

[54] CONTROL VALVE ASSEMBLIES FOR TWO PEDAL-OPERATED HYDRAULIC BRAKING SYSTEMS

[75] Inventor: Desmond H. J. Reynolds, West Midlands, England

[73] Assignee: Lucas Industries Public Limited Company, Birmingham, England

[21] Appl. No.: 380,466

[22] Filed: May 20, 1982

[30] Foreign Application Priority Data

Jun. 9, 1981 [GB] United Kingdom ............... 8117555

[51] Int. Cl.³ ........................................... B60T 13/00
[52] U.S. Cl. ..................................... 60/547.1; 60/581; 303/9; 303/52
[58] Field of Search ............... 303/9, 10, 50, 52, 85; 60/547.1, 550, 581, 582, 591

[56] References Cited

U.S. PATENT DOCUMENTS 3,789,611 2/1974 Marquardt ............................ 303/52
4,405,181 9/1983 Resch et al. ............................ 303/9

Primary Examiner—Bruce H. Stoner, Jr.
Assistant Examiner—Alvin Oberley
Attorney, Agent, or Firm—Scrivener, Clarke, Scrivener and Johnson

[57] ABSTRACT

In dual control assemblies for hydraulic braking systems of vehicles, the valve assemblies comprise a pair of control valves clamped together in side-by-side relationship in each of which a back-up piston works in a greater diameter portion and a hollow spool works in a smaller diameter portion of a stepped bore, the piston and the spool being operated by a push- or pull-rod in turn operated by a pedal. The spool controls communication between pressure spaces of the valves and their respective recuperation, inlet and transfer ports. The recuperation ports are connected to a common reservoir for fluid, the inlet ports are connected to a common hydraulic power source and the transfer ports are interconnected. Each pressure space is connected to a brake via an outlet port.

8 Claims, 8 Drawing Figures

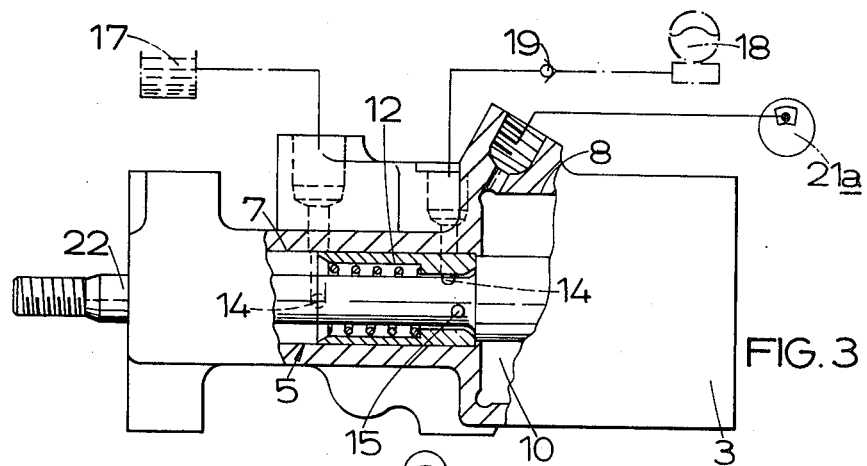
FIG. 3
FIG. 4
FIG. 5
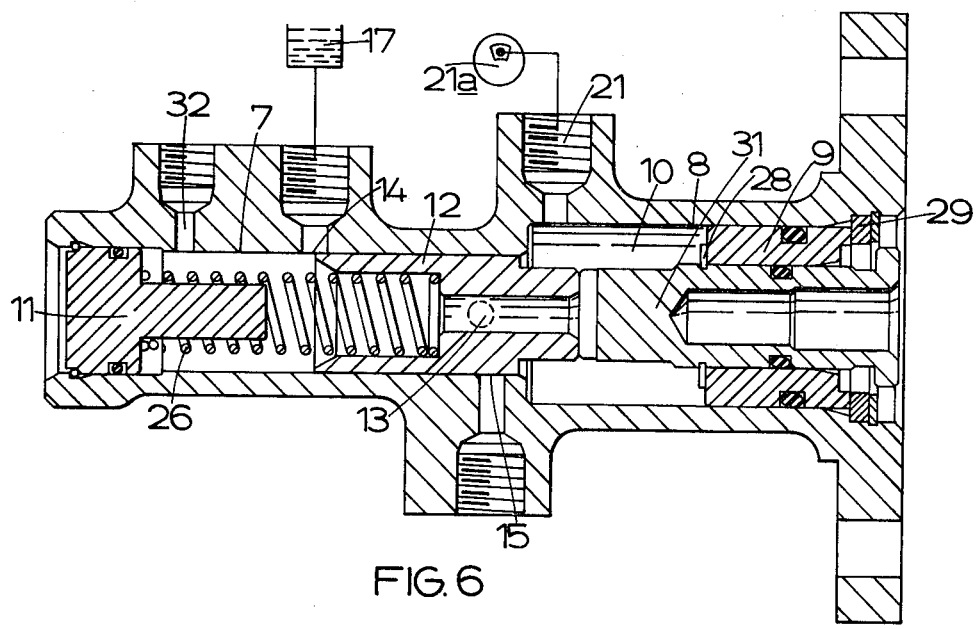
FIG. 6

CONTROL VALVE ASSEMBLIES FOR TWO PEDAL-OPERATED HYDRAULIC BRAKING SYSTEMS

SPECIFIC DESCRIPTION

This invention relates to dual control valve assemblies for hydraulic braking systems for vehicles of the kind comprising a pair of control valves each adapted to be operated by a separate respective pedal to apply a brake on a corresponding side of a vehicle, and pressure spaces in the control valves which are connected to the brakes are both interconnected by a transfer connection which is open when both pedals are operated simultaneously, in order to permit fluid to be transferred between the pressure spaces to compensate for differential wear of linings of the brakes, the transfer connection being closed to prevent such transfer when one pedal is operated on its own.

Control valve assemblies of the kind set forth are commonly incorporated in hydraulic braking systems for agricultural tractors and like vehicle where the brakes on opposite sides of the vehicle are applied simultaneously to effect retardation of the vehicle, and independently to assist steering.

In some known control valve assemblies of the kind set forth each control valve incorporates valve means for controlling communication between a source of fluid under pressure and the pressure space, the pressure space and a reservoir for fluid, and the pressure space and the transfer connection. Operation of the pedal actuates the valve means which, in turn, isolates the pressure space from the reservoir, causes the pressure space to be pressurised by the source to apply the brake, and opens communication between the pressure space and the transfer connection. Upon failure of the source, after the pressure space has been isolated from the reservoir, the pedal is operative to advance a back-up piston in a bore to pressurise the fluid trapped in the pressure space. The valve means may comprise separate valve members operated by the pedal, for example spring-loaded tilting valves, or they may comprise a spool valve assembly having areas of different diameters which define axially spaced lands for co-operation with respective ports and passages in a complementary bore in a housing. When the valve means comprises a spool valve assembly difficulties may be experienced in achieving the necessary concentricity between the different areas and the complementary portions of the bore to ensure efficient and effective operation of the valve assembly.

According to our invention, in a control valve assembly of the kind set forth each control valve incorporates a housing provided with a bore of stepped outline having a first bore portion of smaller area and a second bore portion of greater area, a spool working in the first bore portion, a back-up piston separate from the spool and working in the second bore portion, a pressure space defined in the bore between the back-up piston and a closure for the opposite end of the bore, an outlet port in the housing to provide a permanent open connection between the pressure space and the brake, a recuperation port in the housing for connection to a reservoir for fluid, a transfer port in the housing in permanent connection with the transfer connection, an inlet port in the housing connected to a source of high pressure fluid, and an imperforate rod for operating the spool and which is operated by the pedal, the rod being movable relative to the back-up piston through a limited distance determined by a degree of lost-motion and being sealingly slidable in a bore in the back-up piston, the spool normally being disposed in a retracted position in which the transfer port is closed and the recuperation port is in open communication with the pressure space, in turn placing the outlet port in communication with the reservoir, and operation of the pedal acting to move the rod relative to the back-up piston in a brake-applying direction to urge the spool into an operative position to close the recuperation port, open the transfer port, and cause the pressure space to be pressurised from the source, subsequent movement of the rod upon failure of the source being adapted to take up the lost-motion and carry the back-up piston with it to pressurise the fluid trapped in the pressure space by the closed recuperation port.

When one control valve is operated on its own the transfer connection is closed since the transfer port of the other, non-actuated, control valve is closed by the corresponding spool but when both control valves are operated simultaneously, both transfer ports are opened to place the two pressure spaces in communication through the transfer connection.

Arranging for the spool and the piston to work in different portions of the bore avoids concentricity problems.

Conveniently the rod acts directly on the end of the spool which is adjacent to the back-up piston. In such a construction the rod may act as a pull-rod and extend through a bore in the spool with a substantial clearance. Alternatively the rod may act as a thrust member and project at its inner end from the inner end of the back-up piston for engagement with the spool.

Conveniently the transfer port and the recuperation port are spaced axially from each other and they are controlled by opposite end portions of the spool, the outer end portion remote from the back-up piston controlling the recuperation port, and the inner end portion adjacent to the back-up piston controlling the transfer port. Thus, upon movement of the spool relatively away from the back-up piston, the outer end portion closes the recuperation port and the inner end portion then opens the transfer port.

Preferably, when the spool is in its retracted position, the inner end portion also closes the inlet port, and the inlet port is opened to cause fluid from the source to be admitted into the pressure space when the spool is moved in the brake-applying direction.

Arranging for the ports to be controlled by the opposite end portions facilitates construction since the spool can be of a constant diameter throughout its axial length, requiring only a single machine operation to produce it.

Some embodiments of our invention are illustrated in the accompanying drawings in which:

FIG. 3 is a side elevation including a section on the line 3—3 of FIG. 2;

FIG. 4 is a section on the line 4—4 of FIG. 2;

FIG. 5 is a section on the line 5—5 of FIG. 2;

FIG. 6 is a longitudinal section similar to FIG. 3 through another control valve assembly.

Figure 1:
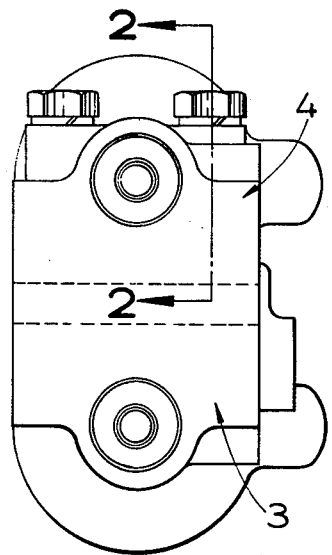
FIG. 1 is an end elevation of a dual control valve assembly for a vehicle hydraulic braking system.
Figure 2:
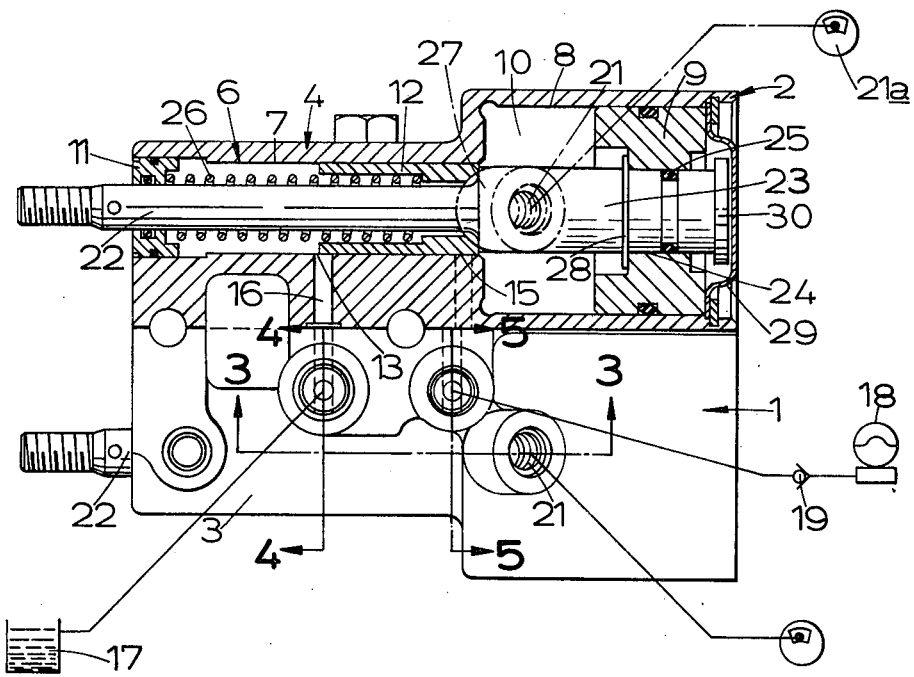
FIG. 2 is a plan of the assembly including a section on the line 2—2 of FIG. 1.

The dual control valve assembly illustrated in FIGS. 1 to 5 of the drawings comprises a pair of control valves 1, 2 which comprise separate housings 3 and 4 clamped together in a side-by-side relationship. Each housing 3, 4 is provided with a longitudinal bore 5, 6 of stepped outline having a bore portion 7 of smaller diameter and a bore portion 8 of greater diameter.

A back-up piston 9 works in each bore portion 8, and a pressure space 10 is defined in each bore 5, 6 between the piston 9 and a closure 11 for the opposite end of the bore 5, 6.

A hollow spool 12 of constant diameter throughout its axial length works in each bore portion 7. Each spool 12 controls communication between the pressure space 10 of the respective housing 3, 4, a recuperation port 13, an inlet port 14, and a transfer port 15. Both recuperation ports 13 are interconnected through connecting passages 16 in the housings 3 and 4 which, in turn, communicate with a common reservoir 17 for fluid. Both inlet ports 14 are interconnected through connecting passages 17a with which a power source 18, suitably an hydraulic accumulator, is in communication through a one-way valve 19. Finally the two transfer ports 15 are in communication through a transfer passage 20.

An outlet port 21 connects each pressure space 10 to a brake 21a on a corresponding side of the vehicle.

Each valve 1, 2 is operated by a pedal (not shown) which acts on the spool 12 of that valve through an imperforate pull-rod 22. As illustrated each pull-rod 22 works through the closure 11 and extends, with a substantial clearance, through the bore of the spool 12. A portion 23 of the pull-rod 22 which is of increased diameter, works through a bore 24 in the piston 9 and carries a seal 25 for sealing engagement in the bore 24. In the position shown in the drawings a spring 26 holds the spool 12 in a retracted position to open the recuperation port 13 and close the ports 14 and 15 so that the pressure space 10 is isolated from the source 18 and is exhausted to the reservoir 17. The spool 12 itself acts on a shoulder 27 on the pull-rod 22, in turn acting on the piston 9 through a radial flange 28 in order to hold the piston 9 in a retracted position against a stop member 29, in which position an enlarged head 30 at the free inner end of the pull-rod 22 is spaced from the piston 9.

When one pedal is operated on its own to operate one of the valves, say the valve 2, the pull-rod 22 is withdrawn from the housing 4 carrying the spool 12 with it by the engagement of the shoulder 27 with the spool 12. Initially this causes the outer end portion of the spool 12 to close the recuperation port 13 to isolate the pressure space 10 from the reservoir 17. Upon subsequent movement in the same direction the opposite inner end of the spool 12 uncovers the transfer port 15 and subsequently uncovers the inlet port 14 so that fluid from the source enters the pressure space 10 to apply the brake 21a on that side of the vehicle. Since the transfer port 15 in the other valve 1 is closed by the spool 12 in that valve no transfer of fluid through the transfer passage 20 can take place.

Whilst the source 18 is operative, the movement of the pull-rod 22 as described above takes place relative to the piston 9, which is held against its stop 29 by the pressure in the pressure space 10, and the distance between the head 30 and the piston 9 defines a degree of lost-motion which is chosen so that the head 30 does not engage the piston 9.

Should the source 18 fail, the pull-rod 22 is moved by the pedal through a further, small distance, to take up the lost-motion, and subsequent movement of the pull-rod 22 with the head 30 in engagement with the piston 9 carries the piston 9 forwardly to pressurise the fluid which is trapped in the pressure space 10 by virtue of the spool 12 having previously closed the recuperation port 13.

When both control valves 1 and 2 are operated together by simultaneous operation of both pedals, which can be latched together, each control valve 1, 2 operates as described above since both transfer ports 15 are in open communication with the pressure spaces 10, transfer of fluid through the transfer passage 20 can take place as necessary in order to compensate for differential wear of the friction linings of the brakes.

In the modified control valve illustrated in FIG. 6 of the drawings the pull-rod 22 is replaced by a pedal-operated push-rod. Basically the push-rod 31 is constituted by omitting from the pull-rod 22 the portion which extends through the closure 11 and the spool 12, and applying a force from the pedal to the outer end of the rod which carries the head 30.

A bleed port 32 is provided at the end of the bore 7 adjacent to the closure 11.

The axis of the inlet port 13 is displaced through a small distance towards the recuperation port 14 and with respect to the axis of the transfer port 15. This ensures that the transfer port 15 attains a fully open position before a fully open position is attained by the inlet port 13.

Figure 7:
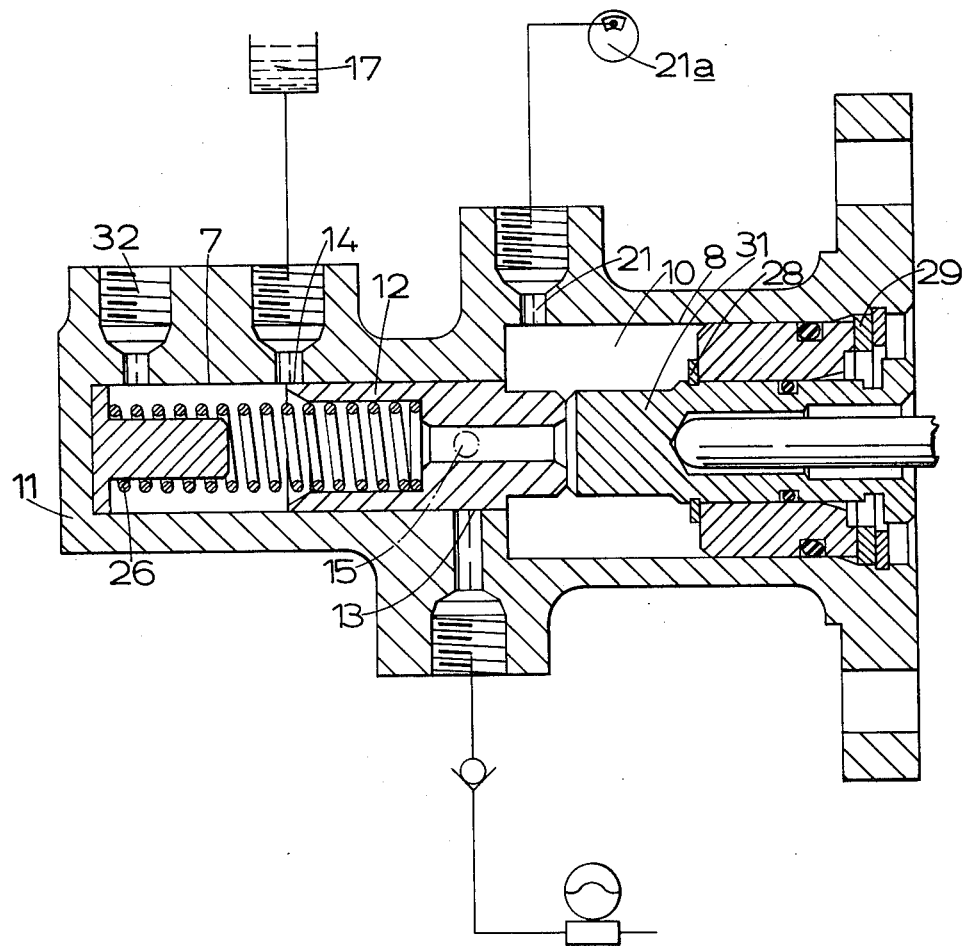
FIG. 7 is a section similar to FIG. 6 of another control valve assembly.

In the control valve of FIG. 7 the closure 11 is formed as an integral part of the housing, and the axes of the inlet port 13 and the balance port 15 are aligned axially.

The construction and operation of the control valve of FIG. 7 is otherwise the same as that of FIG. 6 and corresponding reference numerals have been applied to corresponding parts.

Figure 8:
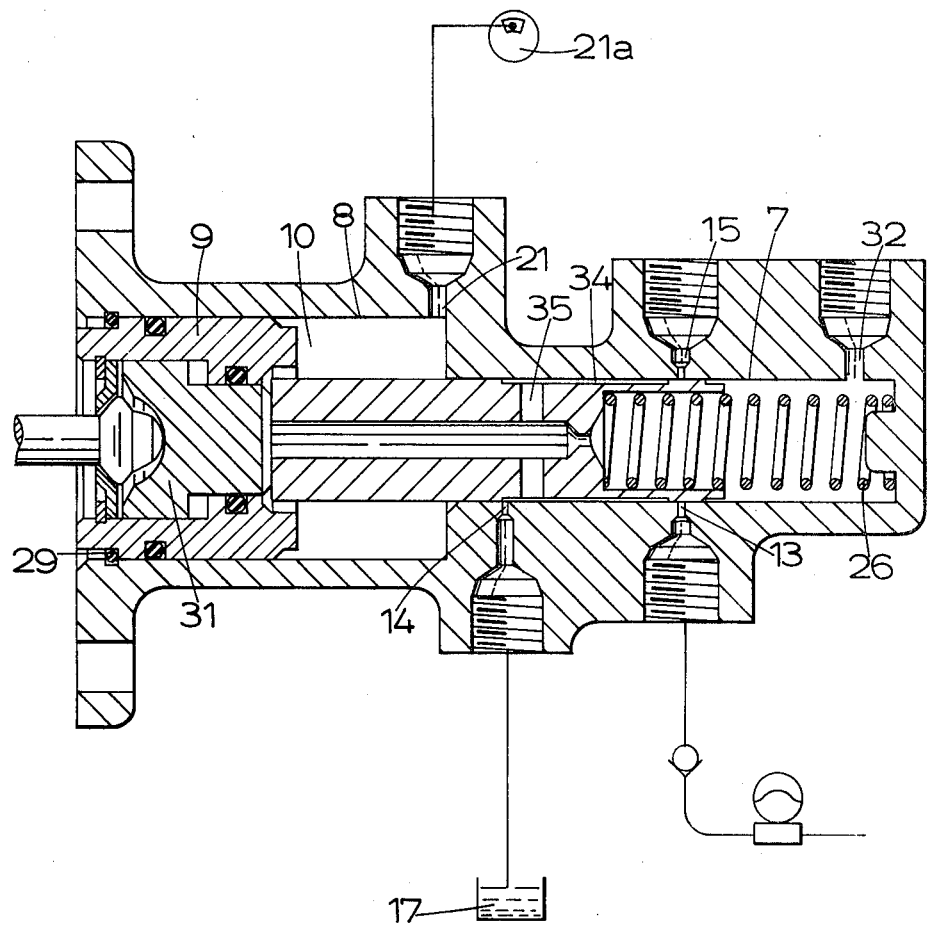
FIG. 8 is a section similar to FIG. 6 of yet another control valve assembly.

In the control valve of FIG. 8 the spool 12 is increased in length and the recuperation port 14 is interchanged with the inlet port 13 and the transfer port 15, of which the axes are again aligned axially.

The spool 12 has spaced lands defined by opposite end portions which are equal in diameter but which are separated by an annular groove 34 of substantial length and which communicates with the hollow centre of the spool 12 through a diametral passage 35. The axial length of the groove 34 is slightly less than the spacing between the recuperation port 14 and the ports 13 and 15 so that, in the retracted position shown, the recuperation port 14 is in communication with the pressure space 10 through the groove 34, the passage 35 and the bore of the hollow spool 12, and the ports 13 and 15 are closed by the land defined by the inner end portion of the spool 12.

When the spool 12 is advanced in its bore, the port 14 is closed by the land at the inner end of the spool 12 and, subsequently, the groove 34 is brought into alignment with the ports 13 and 15 to place them in communication with the pressure space 10.

The construction and operation of the valve of FIG. 8 is otherwise the same as those of FIGS. 6 and 7, and corresponding reference numerals have been applied to corresponding parts.

I claim:

1. A control valve assembly for vehicles comprising a pair of control valves each adapted to be operated by a separate respective pedal to apply a brake on a corresponding side of a vehicle, and pressure spaces in said control valves which are connected to the brakes are both interconnected by a transfer connection which is open when said pedals are operated simultaneously, in order to permit fluid to be transferred between said pressure spaces to compensate for differential wear of linings of said brakes, said transfer connection being closed to prevent such transfer when one pedal is operated on its own, each of said control valves incorporating a housing provided with a bore of stepped outline having a first bore portion of smaller area and a second bore portion of greater area, a spool working in said first bore portion, a back up piston separate from said spool and working in said second bore portion, a pressure space defined in said bore between said back-up piston and a closure for the opposite end of said bore, an outlet port in said housing to provide permanent open connection between said pressure space and said brake, a recuperation port in said housing for connection to a reservoir for fluid, a transfer port in said housing in permanent connection with said transfer connection, an inlet port in the housing connected to a source of high pressure fluid, and an imperforate rod for operating said spool and which is operated by said pedal, said rod being movable relative to said back-up piston through a limited distance determined by a degree of lost-motion and being sealingly slidable in a bore in said back-up piston, said spool normally being disposed in a retracted position in which said transfer port is closed and said recuperation port is in open communication with said pressure space, in turn placing said outlet port in communication with the reservoir, and operation of said pedal acting to move said rod relative to said back up piston in a brake-applying direction to urge said spool into a operative position to close said recuperation port, open said transfer port, and cause said pressure space to be pressurised from the source, subsequent movement of said rod upon failure of the source being adapted to take up the lost-motion and carry said back-up piston with it to pressurise the fluid trapped in said pressure space by said closed recuperation port.

2. A control valve assembly as claimed in claim 1, wherein said rod acts directly on the end of said spool which is adjacent to said back-up piston.

3. A control valve assembly as claimed in claim 2, wherein said rod acts as a pull-rod and extends through said bore in the spool with a substantial clearance.

4. A control valve assembly as claimed in claim 2, wherein said rod acts as a thrust member and projects at it inner end to form the inner end of said back-up piston for engagement with said spool.

5. A control valve assembly as claimed in claim 1 wherein said transfer port and said recuperation port are spaced axially from each other.

6. A control valve assembly as claimed in claim 1 wherein said transfer port and said recuperation port are controlled by opposite end portions of said spool.

7. A control valve assembly as claimed in claim 6, wherein said recuperation port is controlled by the outer end portion of said spool remote from said back-up piston and said transfer port is controlled by the inner end portion of said spool adjacent to said back-up piston.

8. A control valve assembly as claimed in claim 1 wherein, when said spool is in its retracted position, the inner end portion of said spool closes said inlet port and, when said spool is moved in the brake-applying direction, said inlet port is opened to cause fluid from the source to be admitted into said pressure space.

* * * * *